United States Patent [19]

Joseph

[11] 3,796,951

[45] Mar. 12, 1974

[54] SOLID STATE ELECTRONIC GAUGE

[75] Inventor: Craig L. Joseph, San Jose, Calif.

[73] Assignee: FMC Corporation, San Jose, Calif.

[22] Filed: June 28, 1971

[21] Appl. No.: 157,237

[52] U.S. Cl. ............ 324/122, 324/103 P, 324/133, 340/324 R, 340/378

[51] Int. Cl. ........................ G01r 19/00, G01r 19/16

[58] Field of Search ............ 324/103 P, 103 R, 122, 324/133, 96; 340/324 R, 378, 336, 249; 307/311; 356/226, 227; 313/108 D; 250/217 SS

[56] References Cited

UNITED STATES PATENTS

| | | | |
|---|---|---|---|
| 3,452,347 | 6/1969 | Stimson | 340/249 |
| 3,493,812 | 2/1970 | Weimer | 307/311 X |
| 3,505,527 | 4/1970 | Slana | 307/311 X |
| 3,388,292 | 6/1968 | Burns | 340/324 R |

OTHER PUBLICATIONS

"Light–Emitting Diode . . . "; Electronics; Oct. 13, 1969; pg. 159–160;

Read, Jr., S.; "A Neon . . . "; J. of the Soc. of Motion Picture Engineers; June 1937; pg. 633–642;

*Primary Examiner*—Alfred E. Smith
*Assistant Examiner*—Ernest F. Karlsen
*Attorney, Agent, or Firm*—R. S. Kelly; C. E. Tripp

[57] ABSTRACT

A gauge comprised of a series of light emitting diodes (LEDs) connected in series to a constant current source with the number of consecutively arranged LEDs which are turned on being indicative of the level of an analog signal. A series of serially connected transistor switches are arranged with one transistor connected in parallel across each light emitting diode, and the analog signal is utilized to selectively and serially turn on the transistor switches to thereby short circuit an equivalent number of the LEDs whereby the magnitude of the analog signal to the switches is inversely proportional to the number of diodes which are turned on.

5 Claims, 1 Drawing Figure

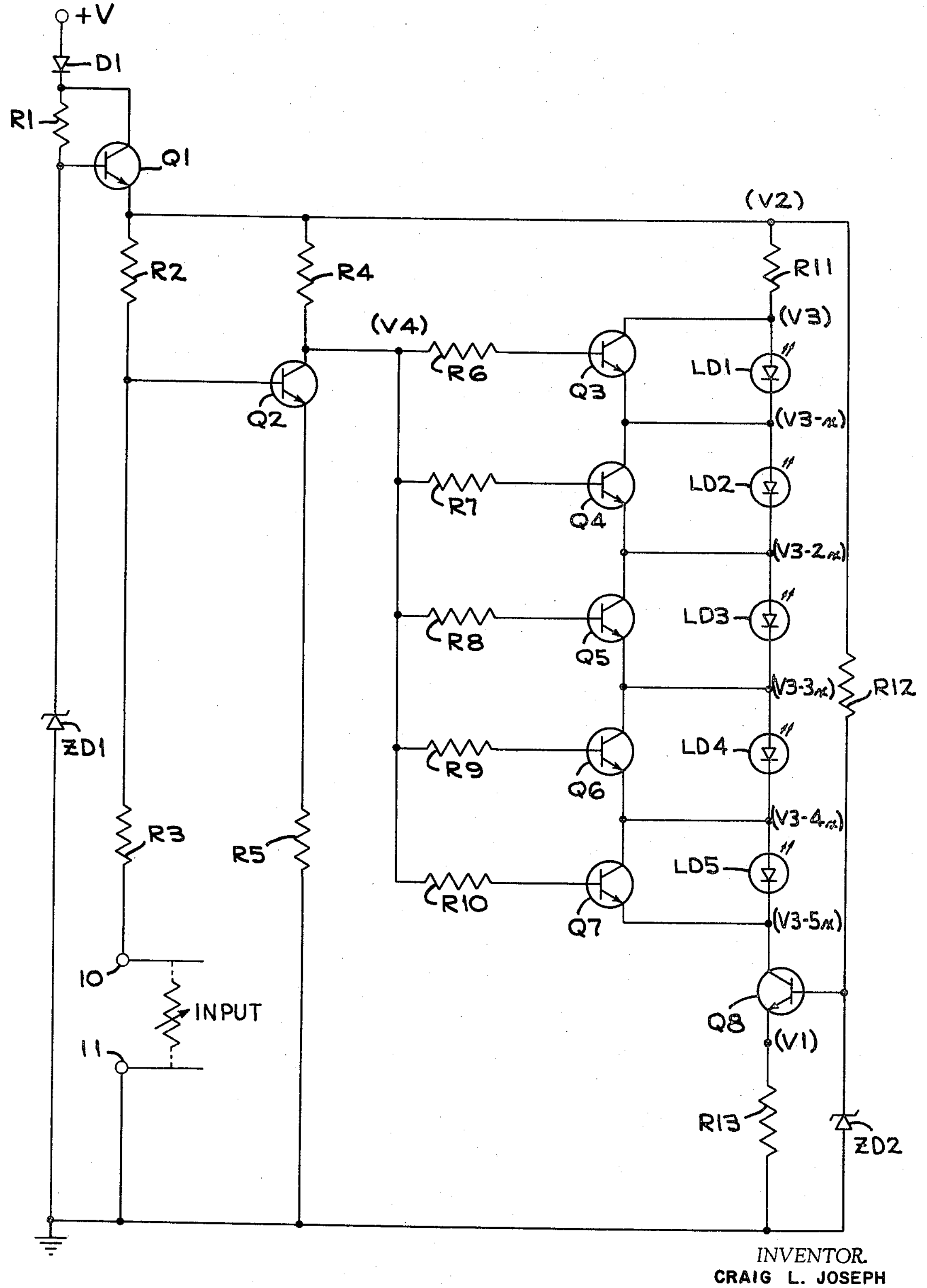
INVENTOR.
CRAIG L. JOSEPH
BY C. E. Tripp
R. S. Kelly
ATTORNEYS

SOLID STATE ELECTRONIC GAUGE

BACKGROUND OF THE INVENTION

1. Field of the Invention

The present invention pertains to electrical circuitry, and more particularly, it pertains to the electrical circuitry for an indicating device such as a gauge.

2. Description of the Prior Art

Semiconductor PN junction diodes which emit visible light have received a considerable amount of attention in recent years for a wide range of indicator applications. These light emitting diodes (LEDs), through recent advances in materials and in device fabrication, are now being produced in large quantities and are readily available. Typically, the noncoherent emitters of visible light are made from materials such as gallium arsenide and have narrow wavelength bands of emitted light.

LEDs are used, typically, in indicator applications where their small size and relatively low power requirements are particularly useful. For example, LEDs have been used as indicators in computer systems and electronic data processing equipment, as an on-off indicator for instruments, as an element in large visual arrays and optical logic systems, and as diagnostic lights on printed circuit boards and panels.

In a typical use of the light emitting diodes for visual arrays, a matrix of such diodes is arranged with each of the diodes in a row and in a column being connected to a common terminal. Then, by a predetermined logic pattern, the rows and columns are strobed and energized so as to light particular diodes to thereby spell out a particular numeral, letter, or the like. When the diodes are used as indicating lights in general, they are turned on in the same manner by some external circuitry; that is to say, the diodes are arranged to be lit when a potential of sufficient magnitude is applied across their terminals and this potential is imposed when external logic circuitry or triggering devices are activated. LEDs will typically have a forward voltage drop of approximately one and a half to two volts, and they are designed to pass current only in one direction as with the conventional PN junction diodes.

SUMMARY OF THE INVENTION

With the circuitry of the present invention light emitting diodes are utilized in a novel manner to form a unique indicating device which may replace conventional gauges of the prior art. Basically, the circuitry comprises a plurality of light emitting diodes which are connected in series to a constant current source. Each of the light emitting diodes is short circuited by a switch, and certain sequentially arranged switches are adapted to be closed in accordance with an external analog signal, the magnitude of which is to be detected and visually indicated by the light emitting diodes. As each switch is closed, the current is by-passed around the associated light emitting diode and the diode thereby fails to be lit. The number of sequentially arranged light emitting diodes which are lit will thereby be generally proportional to the number of switches which are not closed, which, in turn, is generally inversely proportional to the magnitude of the analog signal.

A particular feature of the present invention is the nature of the switch utilized to light the individual light emitting diodes in accordance with the magnitude of the analog signal. This switch comprises a transistor with the base of each of the transistor switches being connected to a common point where the analog signal is received. With a constant current source directing a current serially to each of the light emitting diodes and with the voltage drop across each of the light emitting diodes being of a uniform predetermined magnitude when the diode is lit, the closing of each of the transistor switches will be determined by the magnitude of the voltage of the analog signal on the base of each transistor as compared with the voltage on the collector of the transistor with the latter condition being determined by the predetermined and fixed voltage drops across the successive light emitting diodes. The light emitting diodes are thereby used in a unique manner as a load on a transistor circuit wherein they perform a voltage reference function in accordance with their predetermined voltage drop necessary for conduction and a blocking function to prevent the closing of one or more of the transistor switches.

The gauge of the present invention can easily be used as a sequential indicator for fuel level measurements, pressure measurements, temperature measurements or in other indicating systems having conventional analog signal outputs. The disclosed circuitry is designed to actuate the light emitting diodes sequentially in accordance with a variable sending unit resistance although the circuitry can easily be modified to adapt to other analog signal inputs.

It will be recognized that the gauge of the present invention has several significant advantages over the conventional gauges utilized heretofore. For example, there are no moving parts and hence no friction or inertia problems which tend to incorporate errors into the gauge mechanisms. Also, there is no gauge hysteresis problem as occurs in conventional magnetic pointer gauges. Furthermore, since the indicators give off visible light, there is no need to further illuminate the gauge, such as might be required at night in order to be able to read it.

Another significant advantage of the solid state gauge of the present invention is that the light of many diodes may be arranged in any geometric configuration. This permits a much greater flexibility in the design of the instrument panel since the gauge is not limited to the movement of a swinging pointer or a moving needle as with conventional gauges.

Finally, the circuitry is such that it is functionally interchangeable with existing gauges wherein an analog signal input is utilized. Hence, the gauge of the present invention may be easily incorporated into existing systems without necessitating any major changes in the sensing instruments.

BRIEF DESCRIPTION OF THE DRAWINGS

The drawing schematically illustrates the electrical circuitry of the solid state gauge of the present invention.

DESCRIPTION OF THE PREFERRED EMBODIMENT

In the circuit of the present invention a series of light emitting diodes LD1–LD5 are connected in series and are adapted to be driven by a constant current source which, in the exemplary circuit shown in the drawing, is comprised of a transistor Q8, a current limiting resistor R13 and a Zener diode ZD2 which is connected between the base of transistor Q8 and ground. With the Zener diode ZD2 determining the voltage across the resistor R13 from the emitter of transistor Q8 to ground, the current through the transistor is fixed. The transistor is connected in series with the light emitting diodes LD1 through LD5 as shown. In order to hereinafter illustrate the operation of the circuitry of the present invention, that fixed voltage level which is provided at the emitter of transistor Q8 will be designated as voltage V1.

A regulated power supply for the circuitry of the present invention is provided from a positive DC source potential +V through a diode D1 to the more or less conventional regulating means including resistor R1, Zener diode ZD1 and transistor Q1. With the Zener diode ZD1 fixing the operating point of the transistor Q1, a substantially constant voltage will be provided on the emitter of transistor Q1 which, in the circuitry of the present invention, has been designated as voltage V2. This voltage provides the current source through a resistor R12 to maintain transistor Q8 at the desired operating level, and it will be appreciated that the voltage V2 is sufficiently higher than the voltage V1 so as to provide for the necessary voltage drops (1.5–2 volts) across each of the LED's when they are lit. Current through the light emitting diodes is directed through a resistor R11 which thereby fixes the voltage at the anode of the first light emitting diode LD1, which voltage has been designated as voltage V3 in the circuitry of the present invention.

As is well known, with a constant current source of a predetermined magnitude, the voltage drop across each of the serially connected light emitting diodes will be constant and this voltage drop has been designated as voltage $x$ in the circuitry of the present invention. It will, therefore, be appreciated that the voltage between diodes LD1 and LD2 will be equal to V3 minus $x$, the voltage between diode LD2 and LD3 will be V3 minus $2x$, the voltage between LD3 and LD4 will be V3 minus $3x$, the voltage between LD4 and LD5 will be V3 minus $4x$, and the voltage between LD5 and the collector of the transistor Q8 will be V3 minus $5x$. This, of course, assumes that all of the light emitting diodes are conducting and are not short circuited by the switching circuitry about to be described.

In order to render the light emitting diodes selectively operable as indicating means, a variable analog input signal is provided between input terminals 10 and 11. This input will be seen by the circuitry of the present invention as a variable resistance in series with a fixed resistor R3. For example, a variable input signal at the proper voltage levels may be applied to the base of a transistor which is fixed between the terminals 10 and 11 to vary the operating point thereof and thereby vary the effective resistance of the transistor in the circuitry of the present invention. The variable signal input and the resistor R3 are connected between ground and the base of a transistor Q2. The transistor Q2 is operated by means of the regulated input voltage V2 through biasing resistors R2, R4 and R5. As the signal input resistance varies, the voltage on the base of transistor Q2 will change which will result in a corresponding change in the voltage at the collector of Q2. This latter voltage has been designated as voltage V4 in the circuitry of the present invention.

It will be noted that each of the light emitting diodes LD1–LD5 are short circuited by a transistor Q3–Q7, respectively, and that the transistors Q3–Q7 are biased on by means of a positive current to their base connections through resistors R6–R10, respectively. The transistors Q3–Q7 are all conventional switching transistors with high gain so that they will saturate readily and not remain in a state of partial conduction. Each of resistors R6–R10 are tied to the collector of transistor Q2 and are thereby provided with the input voltage V4 which will vary proportionally with the magnitude of the effective input resistance at the signal terminals 10 and 11.

With the circuitry of the present invention the voltage V4 is adapted to swing between a value slightly higher than the voltage V3 at the anode of the first light emitting diode LD1 to a value slightly less than the voltage V3 minus $5x$ at the cathode of the last light emitting diode LD5. In the former condition, that is when the voltage V4 is greater than V3, each of the light emitting diodes will be short circuited and thereby shut off. This is because the voltage V4, applied to the bases of each of the transistors Q3–Q7, will operate to turn each of the transistors on and thereby short circuit each of the light emitting diodes. It will be noted that the emitter voltages of the transistors Q3–Q7 will follow the voltage V4 provided that a light emitting diode has not established a higher voltage at the transistor emitter connection in which case the emitter base junction of the transistor will be reverse biased to prevent the transistor from being turned on. For example, if the voltage V4 is equal to a value between V3 minus $x$ and V3 minus $2x$ the transistor Q3 will be off and the light emitting diode LD1 will be lit, but the remainder of the light emitting diodes will be unlit. This is true because if V3 minus $x$ is greater than V4 the transistor Q3 will be reverse biased, and current will pass through the light emitting diode LD1. With V4 greater than V3 minus $2x$ the transistor Q4 will be on to short circuit the light emitting diode LD2, and the voltage drop from V4 to V3 minus $2x$ across the light emitting diode LD2 will not be great enough to light this diode. It will also be appreciated that the voltage V4 will, in a similar manner, prevent the conduction of current through each of the other light emitting diodes LD3, LD4 and LD5.

In a similar manner, as the voltage V4 drops to values less than the established voltages between each of the light emitting diodes during conduction, the light emitting diodes will be sequentially lit. As the voltage V4 drops to a value less than voltage V3 minus $5x$, transistor Q7 (as well as all of the other transistors Q3–Q6) will be reverse biased and thereby turned off. This switch condition will permit conduction through each of the light emitting diodes from the constant current source, and the low voltage at V4 (Corresponding to low signal input resistance) will be indicated by a fully lit bank of light emitting diodes.

It will be recognized that with the circuitry of the present invention the number of lights which are lit at any given time will be generally inversely proportional to the magnitude of the voltage V4 which is, in turn, proportional to the input signal resistance at the input terminals 10 and 11. While the light emitting diodes comprise a digital indicating device rather than an analog device, as is conventional, the diodes can be selected so that they will turn on or off within a very narrow voltage range so as to provide the degree of resolution desired. Furthermore, a considerable number of such diodes may be used if greater resolution is needed.

It will be appreciated that no moving parts are involved in the entire circuit structure, and a device with long life and with considerable flexibility in instrument panel design is thereby provided by the circuitry of the present invention. Finally, it can readily be seen that the input circuitry at the terminals 10 and 11 can readily be altered so as to make the circuitry of the present invention adaptable to different types of input signals provided by any of a wide range of sensing instruments. Obvious uses of the circuitry of the present invention would include uses as fuel level indicating gauges, temperature gauges, and pressure gauges on vehicles of various types.

It will also be recognized that the gauge of the present invention provides a digital output from an analog input signal without necessitating any complex conversion or driving circuitry as is usually required in analog to digital instruments. It will be noted that the indicating means itself, i.e., the light emitting diodes, also perform the conversion function from analog to digital by means of their fixed voltage drops required for conduction.

Although the best mode contemplated for carrying out the present invention has been herein shown and described, it will be apparent that modification and variation may be made without departing from what is regarded to be the subject matter of the invention.

What is claimed is:

1. An electronic solid state gauge comprising a plurality of light emitting diodes connected in series and adapted to be sequentially and cumulatively lit in accordance with the magnitude of an external analog signal, a constant current source connected in series with said diodes for providing sufficient current to light each of said diodes, switch means connected across each of said diodes for short circuiting the associated diode, and means connecting said analog signal to each of said switch means to sequentially actuate said switch means and thereby sequentially and cumulatively turn off said light emitting diodes by diverting the driving current therefrom as the magnitude of said analog signal is continuously varied in one direction.

2. A gauge according to claim 1 wherein each of said switch means comprises a switching transistor, said analog signal being connected to each of said transistors so as to sequentially cause the transistors to conduct as the magnitude of said signal is increased.

3. A gauge according to claim 2 wherein the collector and emitter leads of each of said switching transistors are connected across the associated light emitting diode and wherein the base lead of each of said switching transistors is connected to receive said analog signal.

4. A gauge according to claim 1 wherein said constant current source comprises a transistor connected between ground and one of the end diodes of said plurality of light emitting diodes, a Zener diode connected between ground and the base of said transistor, and a voltage supply connected to the base of said transistor and to the other end diode of said plurality of light emitting diodes.

5. A gauge according to claim 2 including an input transistor, means for connecting said analog signal to the base of said input transistor, and means connecting the output current of said input transistor to the base leads of each of said switching transistors.

* * * * *